US010189932B2

(12) United States Patent
Walker et al.

(10) Patent No.: US 10,189,932 B2
(45) Date of Patent: Jan. 29, 2019

(54) THERMOPLASTIC MOLDING COMPOUNDS WITH AN OPTIMIZED RESIDUAL MONOMER CONTENT

(71) Applicant: INEOS STYROLUTION GROUP GMBH, Frankfurt (DE)

(72) Inventors: Roland Walker, Osnabrueck (DE); Gisbert Michels, Leverkusen (DE); Brian J. Banaszak, Mannheim (DE)

(73) Assignee: INEOS STYROLUTION GROUP GMBH (DE)

( * ) Notice: Subject to any disclaimer, the term of this patent is extended or adjusted under 35 U.S.C. 154(b) by 0 days.

(21) Appl. No.: 15/307,122

(22) PCT Filed: Apr. 24, 2015

(86) PCT No.: PCT/EP2015/058892
§ 371 (c)(1),
(2) Date: Oct. 27, 2016

(87) PCT Pub. No.: WO2015/165810
PCT Pub. Date: Nov. 5, 2015

(65) Prior Publication Data
US 2018/0179315 A1 Jun. 28, 2018

(51) Int. Cl.
*C08L 25/12* (2006.01)
*C08L 55/02* (2006.01)
*C08F 279/02* (2006.01)

(52) U.S. Cl.
CPC ............ *C08F 279/02* (2013.01); *C08L 25/12* (2013.01)

(58) Field of Classification Search
CPC .... C08F 279/00; C08F 279/02; C08F 279/04; C08L 55/02; C08L 51/04
See application file for complete search history.

(56) References Cited

U.S. PATENT DOCUMENTS

| | | | | |
|---|---|---|---|---|
| 3,627,840 A | * | 12/1971 | Beer | C08F 255/02 525/242 |
| 4,197,400 A | * | 4/1980 | Wollrab | C08F 6/001 528/500 |
| 4,233,416 A | * | 11/1980 | Kuhar | C08F 20/44 525/234 |
| 4,487,890 A | | 12/1984 | Kishida et al. | |
| 5,204,406 A | * | 4/1993 | Fujii | C08F 265/04 525/205 |
| 6,812,283 B2 | | 11/2004 | Duijzings et al. | |
| 2003/0181583 A1 | * | 9/2003 | Duijzings | C08C 1/07 525/78 |
| 2006/0034962 A1 | | 2/2006 | Guntherberg et al. | |
| 2016/0075813 A1 | | 3/2016 | Niessner et al. | |
| 2016/0083572 A1 | | 3/2016 | Niessner et al. | |

FOREIGN PATENT DOCUMENTS

| | | |
|---|---|---|
| DE | 102005022632 A1 | 11/2006 |
| DE | 102005022635 A1 | 11/2006 |
| EP | 0022200 A1 | 1/1981 |
| EP | 0077038 A1 | 7/1982 |
| WO | 02/10222 A1 | 2/2002 |
| WO | 2004/028781 A1 | 4/2004 |
| WO | 2008/020012 A2 | 2/2008 |
| WO | 2009/103714 A2 | 8/2009 |
| WO | 2014/170406 A1 | 10/2014 |
| WO | 2014/170407 A1 | 10/2014 |
| WO | 2015/086164 A1 | 6/2015 |

* cited by examiner

*Primary Examiner* — Jeffrey C Mullis
(74) *Attorney, Agent, or Firm* — J.A. Lindeman & Co., PLLC

(57) ABSTRACT

The present invention relates to a process for the production of styrene graft copolymers comprising addition and graft copolymerization of styrene monomers A1 and vinyl cyanide monomers A2 to a graft base B where the ratio by mass of A1 to A2 in the monomer feed at the end of the monomer feed time is lower than the ration by mass integrated over the entire monomer feed time. The present invention further relates to a graft copolymer obtainable by a process according to the invention, a molding composition comprising such a graft copolymer, and a molding obtained from such a molding composition.

20 Claims, No Drawings

THERMOPLASTIC MOLDING COMPOUNDS WITH AN OPTIMIZED RESIDUAL MONOMER CONTENT

The present invention relates to a process for the production of styrene graft copolymers, comprising addition of styrene monomers A1 and vinyl cyanide monomers A2 to a graft base B (graft copolymerization). The ratio by mass of component A1 to A2 in the monomer feed here is lower at the end of the monomer feed time than the ratio by mass integrated over the entire monomer feed time. The present invention further relates to graft copolymers obtainable by the process as claimed in the present invention, and also to molding compositions which comprise a graft copolymer of this type, and also to moldings obtained from molding compositions of this type.

Styrene graft copolymers which comprise a graft shell made of styrene monomers and of vinyl cyanide monomers are known in the prior art. By way of example, there are numerous known embodiments of acrylonitrile-butadiene-styrene graft copolymers (ABS copolymers) which comprise a polybutadiene-containing graft base B and an acrylonitrile- and styrene-containing graft shell A. Styrene graft copolymers of this type are moreover commonly mixed (compounded) with other polymers in order to produce impact-modified molding compositions (polymer blends), for example via extrusion of the styrene graft copolymers with other polymers. Impact-modified molding compositions of this type are used by way of example to produce moldings which have increased resilience and impact resistance.

These moldings serve by way of example as constituents of internal and external components of motor vehicles and of buildings, as furniture, as constituents of household equipment, of electrical equipment, of sports equipment, and of medical equipment, of tools, of consumer products, of toys (e.g. interlocking bricks), of musical instruments, of chip cards, of safety equipment (e.g. helmets and knee protectors), spectacles, and packaging. Moldings of this type can moreover, in contrast to many other plastics moldings, be coated with metals (galvanized), and also bonded to numerous other molding compositions and metals to give composite materials. Impact-modified molding compositions comprising ABS graft copolymers of this type can moreover be used in 3D printers.

A factor inhibiting use of styrene graft copolymers in molding compositions and in moldings produced therefrom is that the residual monomers (styrene monomers and vinyl cyanide monomers) remaining after graft copolymerization are undesirable, if only because of their odor, and in many cases are considered by users to be problematic.

A resultant requirement by way of example specifically in sensitive sectors, for example where the molding compositions are used to produce food packaging that is in direct contact with food, and when they are used in medical products, laboratory equipment, and toys, is that, before or during compounding, complicated methods are used to remove residual monomers remaining after graft copolymerization, with the aim of reducing residual monomer content and obtaining a product with neutral odor.

There is therefore a need for processes where the styrene graft copolymers have lower residual monomer content, in particular lower styrene monomer content, or the latter can at least be removed more easily from the styrene graft copolymers.

Surprisingly, it has been found that a process where, in the graft copolymerization of styrene monomers A1 and of vinyl cyanide monomers A2 onto the graft base B, the ratio by mass of A1 to A2 is reduced at the end of the monomer feed time gives styrene graft copolymers, and molding compositions that can be produced therefrom, with lower residual monomer content. These molding compositions have inter alia reduced odor. The surface of the styrene graft copolymers produced by this process (the exterior region of the copolymer) moreover has higher vinyl cyanide content which is significantly closer to the content frequently used in the polymer matrix (e.g. SAN) also used in molding compositions. This can further improve the miscibility of the styrene graft copolymers with the polymer matrix. Provision of improved molding compositions becomes possible.

A first aspect of the invention provides a process for the production of styrene graft copolymers comprising the following steps:

(i) provision and agglomeration of the graft base B present in an emulsion;

(ii) addition of styrene monomers A1 and vinyl cyanide monomers A2 to the graft base B over a defined monomer feed time; and (iii) simultaneous graft copolymerization of the added styrene monomers A1 and of the vinyl cyanide monomers A2 onto the agglomerated graft base B, where, in step (ii), the ratio by mass of styrene monomers A1 to vinyl cyanide monomers A2 in the monomer feed at the end of the monomer feed time is lower than the ratio by mass of the components of the monomer feed integrated over the entire monomer feed time.

For the purposes of the invention, styrene graft copolymers are preferably those that can be used in thermoplastic molding compositions. It is preferable that these themselves have substantially thermoplastic properties. The styrene graft copolymers obtainable by the process of the invention typically comprise a graft base B as core and a graft shell A. The graft shell A comprises (as units) the styrene monomers A1 and vinyl cyanide monomers A2. It is preferably, but not essential, that the styrene graft copolymers obtainable (or obtained) by the process of the invention have a substantially spherical structure. The styrene graft copolymers are preferably obtained in particulate form, although during compounding with other polymers (i.e. during production of polymer-blend-based molding compositions), in particular at elevated temperatures, it is optionally possible that fiber-type connections arise between a plurality of styrene graft copolymer particles. By way of example, structures of this type arise from or involve molten graft base.

When a feature is characterized herein as "substantially" this means that the extent of compliance with the feature concerned can be complete or almost (e.g. at least 95%) complete. By way of example, an ellipsoidal or amorphous structure can also generally be interpreted as substantially spherical, and particulate structures connected to one another by way of fiber-type connections which are significantly thinner than the particulate structures can also be interpreted as substantially spherical.

It is preferable that the graft base B used has a substantially spherical structure. It is preferable that the average diameter $d_{50}$ of the particles of the graft base B is from 25 to 2500 nm, preferably from 30 to 2000 nm, preferably from 40 to 1000 nm, preferably from 50 to 750 nm, preferably from 60 to 500 nm, preferably from 70 to 400 nm, in particular from 75 to 300 nm. The average diameter of the graft base B can also be about 75-200 nm or 75-150 nm.

The average particle diameter $d_{50}$ is to be interpreted as the diameter such that 50% by weight of the particles have a smaller diameter, and 50% by weight of the particles have a larger diameter, than the average diameter $d_{50}$.

Particle diameters $d_{10}$ and $d_{90}$ are moreover defined as follows:

$d_{10}$ is the diameter such that 10% by weight of the particles are smaller than this value, and $d_{90}$ is the diameter such that 90% by weight of the particles are smaller than this value.

The weight-average particle size $d_w$ can be calculated by means of the following formula:

$$d_w = \text{sum}(ni*di^4)/\text{sum}(ni*di^3),$$

where ni is the number of particles with diameter di.

The average diameter $d_{50}$ and the weight-average particle size $d_w$ of the graft base B or of the graft copolymer can be measured by using a disk centrifuge. The measurement can by way of example be made in an aqueous sugar solution with sucrose density gradient of from 8 to 20% by weight; this can provide particularly stable flotation behavior. A polybutadiene latex with comparatively narrow distribution and moderate particle size can be used for calibration.

The particle size distribution of the graft base B can be as desired. It is preferable that 90% of the particles of the graft base B have a size which is within the range of no more than +/−75% deviation from the average diameter of the graft base B. If, therefore, the average diameter of the graft base B is by way of example 100 nm, 90% of the particles of the graft base B have a size which is in the range from 25 to 175 nm.

It is more preferable that 90% of particles of the graft base B have a size which is within the range of no more than +/−50% deviation from the average diameter of the graft base B, more preferably in the range of no more than +/−25% deviation from the average diameter of the graft base B, in particular in the range of no more than +/−15% deviation from the average diameter of the graft base B.

It is also optionally possible to use two graft bases B with different average diameters. It is then possible to obtain bimodular (bimodal) styrene graft copolymers by the process of the invention. It is likewise optionally possible to use three graft bases B with different average diameters. It is then possible to obtain trimodular styrene graft copolymers by the process of the invention. It is likewise optionally possible to use more than three graft bases B with different average diameters. It is then possible to obtain multimodular styrene graft copolymers by the process of the invention.

Agglomeration of the graft base B can be achieved in various ways. By way of example, a copolymer of one or more $C_1$-$C_{12}$-alkyl (meth)acrylates and of one or more hydrophilic comonomers (e.g. acrylamide, methylacrylamide, ethylacrylamide and/or n-butylacrylamide) can be used to permit agglomeration.

By way of example, a copolymer of ethyl acrylate and methylacrylamide is used. This type of agglomeration is known to the person skilled in the art, for example from WO 2008/020012, DE 10 2005 022 632, and DE 10 2005 022 635.

The person skilled in the art is moreover aware of other possibilities for agglomerating the graft base, see by way of example EP-A 0 022 200, EP-A 0 077 038, and WO 2002/010222. Agglomeration of the graft base B is typically achieved in a dispersion comprising the means of agglomeration, as described by way of example in WO 2014/170406, WO 2014/170407, or PCT/EP2014/057826, and the graft base B in a suitable solvent. The agglomeration can by way of example be carried out as described in any of the patent applications mentioned above.

Addition of the styrene monomers A1 and of the vinyl cyanide monomers A2 to the graft base B can take place continuously or stepwise. Addition can be automated or manual. The total quantity of styrene monomers A1 and vinyl cyanide monomers A2 (ΣA1+A2) added per unit of time can remain identical over the entire of monomer feed time, or increase, or decrease, or vary in any other way.

The graft copolymerization can be initiated in any manner known in the prior art, for example thermally (by temperature increase), by free-radical initiator (e.g. peroxides (e.g. benzoyl peroxide), azo compounds (e.g. 2,2'-azobisisobutyronitrile, AIBN), persulfate, redox initiators composed of an organic hydroperoxide, of a reducing agent, and optionally of a transition metal salt, Brönstedt acids (e.g. perchloro acid or trifluoromethanesulfonic acid), and/or by tertiary systems (e.g. by a tertiary system comprising benzoyl peroxide, 3,6-bis(o-carboxybenzoyl)-N-isopropylcarbazole, and indenylzirconium dichloride), by irradiation with high-energy radiation (e.g. light, e.g. in the region <400 nm), radioactive radiation (α-, β-, or γ-radiation and/or X-ray radiation), electrolytically (i.e. by passage of current between electrodes in contact with the monomers), by plasma, and/or by introduction of high-energy ultrasound.

The polymerization process can be any desired polymerization process, for example emulsion polymerization, free-radical bulk polymerization, or solution polymerization. It is preferable to use emulsion polymerization, in particular emulsion polymerization in an aqueous solution.

It is particularly preferable that, on conclusion of monomer feed, including an optional continued-stirring phase and therefore also the graft copolymerization, the aqueous emulsion mixture comprises about 30-50% by weight of solid (i.e. styrene graft copolymers and residual monomers) in from 50 to 70% by weight of aqueous solution, for example about 38-42% by weight of solid (i.e. styrene graft copolymers and residual monomers) in from 58 to 62% by weight of aqueous solution.

The length of the monomer feed time over which the monomers A1 and A2 are added depends on the components used (graft base B, styrene monomers A1, and vinyl cyanide monomers A2), on the polymerization process used, and on the reaction conditions used (e.g. temperature, pressure, any solvents used). The monomer feed time can be a small number of minutes (e.g. 2 to 5), a larger number of minutes (e.g. from 6 to 30), an hour, or more than one hour (e.g. from 2 to 5). The monomer feed time, and therefore also the copolymerization time, is preferably from 30 min to 6 h, more preferably from 2 to 5 h, particularly preferably from 1 h to 3 h. Said feed preferably takes place during aqueous emulsion polymerization at a temperature of from 50 to 150° C., in particular from 60 to 85° C. The monomer feed time is defined in that the intended polymerization time is preferably fixed before the start of the reaction.

The expression "end of the monomer feed time" preferably means the final 10% of the monomer feed time. By way of example, therefore, the duration of the end of a monomer feed time of one hour (=60 min) is specifically 6 min.

It is preferable that, at least in the final minute of the monomer feed time, the ratio by mass of A1 to A2 in the monomer feed is lower than the ratio by mass in the monomer feed integrated over the entire monomer feed time. It is moreover preferable that at least in the final five minutes of the monomer feed time the ratio by mass of A1 to A2 in the monomer feed is lower than the ratio by mass in the monomer feed integrated over the entire monomer feed time.

If, as is optionally possible, the total quantity of styrene monomers A1 and vinyl cyanide monomers A2 added per unit of time remains identical over the entire monomer feed time, the expression "a lower ratio by mass of A1 to A2 at the end of the monomer feed time" means implicitly that at the end of the monomer feed time more vinyl cyanide monomers A2 are added than integrated over the entire monomer feed time, and that equally at the end of the monomer feed time fewer styrene monomers A1 are added than integrated over the entire monomer feed time.

If, as is optionally possible, the total quantity of styrene monomers A1 and vinyl cyanide monomers A2 added per unit of time decreases over the entire monomer feed time, the expression "a lower ratio by mass of A1 to A2 at the end of the monomer feed time" means implicitly that at the end of the monomer feed time fewer styrene monomers A1 are added than integrated over the entire monomer feed time, where the quantity of vinyl cyanide monomers A2 added does not necessarily decrease or increase.

If, as is optionally possible, the total quantity of styrene monomers A1 and vinyl cyanide monomers A2 added per unit of time increases over the entire period, the expression "a lower ratio by mass of A1 to A2 at the end of the monomer feed time" means that implicitly at the end of the monomer feed time more vinyl cyanide monomers A2 are added than integrated over the entire monomer feed time, where the quantity of styrene monomers A1 added does not necessarily decrease or increase.

Once the monomer feed time has ended, the reaction mixture can optionally be allowed to stand for a further period under conditions which permit further polymerization of the remaining monomers (continued-stirring phase), or else alternatively the polymerization can be terminated.

The ratio by mass in the monomer feed is the ratio by mass of the styrene monomers A1 added within a certain time interval to vinyl cyanide monomers A2 added in the same time interval.

The ratio by mass in the monomer feed can accordingly be obtained from the ratio by mass of styrene monomers A1 and vinyl cyanide monomers A2 which are added simultaneously by way of example when A1 and A2 are present in a mixture with one another and the mixture is added into the reaction vessel in which the graft copolymerization takes place, or when A1 and A2 are respectively added independently into the reaction vessel in which the graft copolymerization takes place.

The ratio by mass in the monomer feed can alternatively also be obtained from the ratio by mass of A1 to A2 where A1 and A2 are respectively added within a time interval of less than 5 min, preferably less than 2 min, preferably less than 1 min, in particular less than 30 s, into the reaction vessel in which the graft copolymerization takes place.

The ratio by mass in the monomer feed integrated over the entire monomer feed time is the ratio by mass of the total mass of styrene monomers A1 added over the entire monomer feed time to the total mass of vinyl cyanide monomers A2 added over the entire monomer feed time (i.e. $\int^{total} A1$ to $\int^{total} A2$).

A styrene graft copolymer can be obtained after step (iii) of the process, or there can be one or more subsequent further polymerization steps.

In a preferred embodiment, step (iii) is followed by the following step (iv):
(iv) addition of vinyl cyanide monomers A2 and graft copolymerization of these onto the agglomerated graft base B, where no styrene monomers A1 are added.

The addition and graft copolymerization in step (iv) can be simply addition of vinyl cyanide monomers A2, optionally in a solvent. Alternatively, it is also possible to add polymerization initiators, additional substances, and/or other monomers which are not styrene monomers A1. The addition of vinyl cyanide monomers A2 and graft copolymerization of these onto the graft base B in step (iv) can in principle take place here over any desired monomer feed time. By way of example, this monomer feed time can be less than 10 min, 10 min or more, 20 min or more, 30 min or more, or more than an hour (e.g. for 1.1 to 3 hours). This monomer feed time can be less than 1%, 1% or more, 5% or more, 10% or more, 20% or more, 50% or more, more than 75%, of the monomer feed time in step (ii).

The monomer feed time here, and therefore also the copolymerization time, is preferably from 30 min to 6 h, more preferably from 2 to 5 h, particularly preferably from 1 h to 3 h.

According to the invention, the graft base B used in the process can be any graft base that is suitable as base for graft copolymerization of styrene monomers and of vinyl cyanide monomers. The person skilled in the art is aware that it is preferable, but not necessary, that the graft base B comprises vinyl groups (C═C double bonds) accessible to the monomers A1 and A2. Alternatively, or in addition, the graft base B can also optionally comprise other functional groups, for example those capable of forming free radicals.

In a preferred embodiment, the graft base B is a rubber-containing graft base. The expression "rubber-containing graft base" is intended here to mean, in the widest sense, a graft base B which mainly comprises resilient polymers. It is preferable that resilient polymers of this type comprise vinyl groups (C═C double bonds).

In a more preferred embodiment, the graft base B comprises more than 50% by weight, based on solids content, of diene rubber or diene-vinyl copolymer rubber.

Preferably the graft base B comprises more than 60% by weight, preferably more than 70% by weight, preferably more than 80% by weight, in particular more than 90% by weight, based on solids content, of diene rubber or diene-vinyl copolymer rubber.

It is particularly preferable that the graft base B comprises more than 60% by weight, preferably more than 70% by weight, preferably more than 80% by weight, based on solids content, of diene rubber, in particular more than 90% by weight, based on solids content, of diene rubber, in particular polybutadiene. It is particularly preferable that the graft base B comprises more than 50% by weight, based on solids content, of polybutadiene, more preferably more than 60% by weight, based on solids content, of polybutadiene, more preferably more than 70% by weight, based on solids content, of polybutadiene, more preferably more than 80% by weight, based on solids content, of polybutadiene, in particular more than 90% by weight, based on solids content, of polybutadiene.

The graft base B comprises about 79-100% by weight, based on the solids content, of polybutadiene, and about 0-21% by weight, based on solids content, of styrene monomers, preferably about 90-100% by weight, based on solids content, of polybutadiene and about 0-10% by weight, based on solids content, of styrene monomers, in particular about 90-95% by weight, based on solids content, of polybutadiene, and about 5-10% by weight, based on solids content, of styrene monomers. The graft base B can optionally moreover comprise other monomers, for example from 0 to 10% by weight, based on solids content, of vinyl cyanide monomers (for example acrylonitrile monomers).

In the process of the invention, a graft shell A which comprises styrene monomers A1 and vinyl cyanide monomers A2 is graft-copolymerized onto the graft base B.

The styrene monomers here can be any desired styrene monomers. The styrene monomers can be monomers of a single type or a mixture of different styrene monomers. In one preferred embodiment, the styrene monomers A1 are selected from the group consisting of styrene, α-methylstyrene, $C_1$-$C_8$-alkyl-ring-substituted styrene, and mixtures of two or more thereof. In a particularly preferred embodiment, the styrene monomers A1 are styrene.

The vinyl cyanide monomers A2 can be any desired vinyl cyanide monomer. The vinyl cyanide monomers A2 can be monomers of a single type, or a mixture of different vinyl cyanide monomers. In a preferred embodiment, the vinyl cyanide monomers A2 are acrylonitrile, methacrylonitrile, or mixtures thereof, but in particular acrylonitrile.

It is preferable that the styrene monomers A1 are selected from the group consisting of styrene, α-methylstyrene, $C_1$-$C_8$-alkyl-ring-sybstituted styrene, and mixtures of two or more thereof, and that the vinyl cyanide monomers A2 are acrylonitrile, methacrylonitrile or mixtures thereof. It is particularly preferable that the styrene monomers A1 are styrene and that the vinyl cyanide monomers A2 are acrylonitrile.

The ratio by mass of styrene monomers A1 to vinyl cyanide monomers A2 (A1 to A2) in the graft shell can be as desired. It is preferable that the styrene monomers A1 are predominant (A1:A2 therefore being >1).

In a preferred embodiment, therefore, the ratio by mass of styrene monomers A1 to vinyl cyanide monomers A2 integrated over the entire monomer feed time is from 50:50 to 95:5, preferably from 60:40 to 90:10, more preferably from 65:35 to 90:10, in particular from 70:30 to 85:15. Preference is accordingly given to a process which comprises the following steps for the production of styrene graft copolymers:

(i) provision and agglomeration of the graft base B present in an emulsion, which comprises from 79 to 100% by weight, based on solids content, of polybutadiene and from 0 to 21% by weight, based on solids content, of polybutadiene styrene monomers;

(ii) addition of styrene A1 and acrylonitrile A2 in a ratio by mass of A1 to A2 of from 60 to 40 to 90 to 10 to the graft base B over a defined monomer feed time; and (iii) simultaneous graft copolymerization of the added styrene A1 and acrylonitrile A2 onto the agglomerated graft base B, where, in step (ii), the ratio by mass of styrene A1 to acrylonitrile A2 in the monomer feed in the final tenth of the monomer feed time is lower than the ratio by mass in the monomer feed integrated over the entire monomer feed time.

As already described above, in the process of the invention the ratio by mass of styrene monomers A1 to vinyl cyanide monomers A2 at the end of the monomer feed time is lower than the ratio by mass integrated over the entire monomer feed time.

In a preferred embodiment, in step (ii), the ratio by mass of styrene monomers A1 to vinyl cyanide monomers A2 in the monomer feed in the final fifth of the monomer feed time is lower by at least 10% than the ratio by mass integrated over the entire monomer feed time.

It is more preferable that, in step (ii), the ratio by mass of styrene monomers A1 to vinyl cyanide monomers A2 in the monomer feed in the final fifth of the monomer feed time is lower by at least 15% than the ratio by mass integrated over the entire monomer feed time. In a preferred embodiment, in step (ii), the ratio by mass of styrene monomers A1 to vinyl cyanide monomers A2 in the monomer feed in the final fifth of the monomer feed time is lower by at least 20% than the ratio by mass integrated over the entire monomer feed time.

In a preferred embodiment, in step (ii), the ratio by mass of styrene monomers A1 to vinyl cyanide monomers A2 in the monomer feed in the final fifth of the monomer feed time is lower by at least 25% than the ratio by mass integrated over the entire monomer feed time.

It is particularly preferable that, in step (ii) the ratio by mass of styrene monomers A1 to vinyl cyanide monomers A2 in the monomer feed in the final fifth of the monomer feed time is lower by at least 28% than the ratio by mass integrated over the entire monomer feed time.

It is also moreover preferable that, in step (ii), the ratio by mass of styrene monomers A1 to vinyl cyanide monomers A2 in the monomer feed in the final fifth of the monomer feed time is lower by at least 10% than the ratio by mass integrated over the entire monomer feed time, preferably being lower by at least 15% than the ratio by mass integrated over the entire monomer feed time, in particular being lower by at least 20% than the ratio by mass integrated over the entire monomer feed time.

It is moreover still more preferable that, in step (ii), the ratio by mass of styrene monomers A1 to vinyl cyanide monomers A2 in the monomer feed in the second half of the monomer feed time is lower by at least 5% than the ratio by mass integrated over the entire monomer feed time, preferably being lower by at least 10% than the ratio by mass integrated over the entire monomer feed time, in particular being lower by at least 15% than the ratio by mass integrated over the entire monomer feed time.

It is also optionally possible that at the end of the monomer feed time addition of styrene monomers A1 is terminated entirely and that only vinyl cyanide monomers A2 are then added. The expression "end of the monomer feed time" here is to be interpreted in the widest sense defined above. The end of the monomer feed time then corresponds approximately to step (iv), except that there is no precondition of any preceding reduction of the ratio by mass of A1 to A2.

Particular preference is given to a process which comprises the following steps for the production of styrene graft copolymers:

(i) provision and agglomeration of the graft base B present in an emulsion, which comprises from 79 to 100% by weight, based on solids content, of polybutadiene and from 0 to 21% by weight, based on solids content, of styrene monomers;

(ii) addition of styrene A1 and acrylonitrile A2 in a ratio by mass of A1 to A2 of from 60 to 40 to 90 to 10 to the graft base B over a defined monomer feed time; and (iii) simultaneous graft copolymerization of the added styrene A1 and acrylonitrile A2 onto the agglomerated graft base B, where, in step (ii), the ratio by mass of styrene A1 to acrylonitrile A2 in the monomer feed in the final tenth of the monomer feed time is lower by at least 10% than the ratio by mass in the monomer feed integrated over the entire monomer feed time.

The ratio by mass of styrene monomers A1 to vinyl cyanide monomers A2 in step (ii) can decrease progressively over the monomer feed time, or can be reduced only at the end of the monomer feed time (for example in the second half, in the final fifth, or in the final tenth).

In a preferred embodiment, in step (ii), the ratio by mass of styrene monomers A1 to vinyl cyanide monomers A2 decreases progressively over the monomer feed time.

Accordingly, the ratio by mass decreases not only at the end of the monomer feed time but instead in at least two, three, four, or more steps, or substantially continuously over the monomer feed time. It is preferable here that there is also no intermediate increase in the ratio by mass.

In a preferred embodiment, the ratio by mass decreases substantially continuously over the monomer feed time.

The expression "substantially continuous decrease" means in the widest sense a ratio by mass of A1 to A2 which always continues to decrease over the monomer feed time. The gradient profile of the ratio by mass here can be as desired. By way of example, the ratio by mass can be decreased linearly or exponentially, and/or correlate with a defined ratio by mass. It is preferable that the decrease of the ratio by mass of A1 to A2 is substantially continuously linear over the monomer feed time.

Accordingly, particular preference is given to a process which comprises the following steps for the production of styrene graft copolymers:
(i) provision and agglomeration of the graft base B present in an emulsion, which comprises from 90 to 100% by weight, based on solids content, of polybutadiene and from 0 to 10% by weight, based on solids content, of styrene monomers;
(ii) addition of styrene A1 and acrylonitrile A2 in a ratio by mass of A1 to A2 of from 60 to 40 to 90 to 10 to the graft base B over a defined monomer feed time; and
(iii) simultaneous graft copolymerization of the added styrene A1 and acrylonitrile A2 onto the agglomerated graft base B,
where, in step (ii), the decrease of the ratio by mass of styrene A1 to acrylonitrile A2 in the monomer feed is substantially continuously linear over the monomer feed time, where the ratio by mass in the final tenth of the monomer feed time is lower by at least 10% than the ratio by mass in the monomer feed integrated over the entire monomer feed time.

Any desired ratios by mass of graft base B to graft shell styrene monomers A1 and vinyl cyanide monomers A2 can be used.

In a preferred embodiment, the ratio by mass of graft base B to graft shell made of styrene monomers A1 and vinyl cyanide monomers A2 is from 80 to 20 to 20 to 80, more preferably being from 70 to 30 to 30 to 70, still more preferably being from 70 to 30 to 50 to 50, in particular from 58 to 42 to 62 to 38.

Accordingly, particular preference is given to a process which comprises the following steps for the production of styrene graft copolymers:
(i) provision of from 50 to 70 parts by weight of an agglomerated graft base B which comprises from 90 to 100% by weight, based on solids contents of polybutadiene and from 0 to 10% by weight, based on solids content, of styrene monomers;
(ii) addition of a total of from 30 to 50 parts by weight of styrene A1 and acrylonitrile A2 in a ratio by mass of A1 to A2 of from 60 to 40 to 90 to 10 to the graft base B over a defined monomer feed time;
(iii) simultaneous graft copolymerization of the added styrene A1 and acrylonitrile A2 onto the agglomerated graft base B,
where, in step (ii), the decrease over the ratio by mass of styrene A1 to acrylonitrile A2 in the monomer feed is substantially continuously linear over the monomer feed time, where the ratio by mass in the final tenth of the monomer feed time is lower by at least 10% than the ratio by mass in the monomer feed integrated over the entire monomer feed time.

Accordingly, very particular preference is given to a process which comprises the following steps for the production of styrene graft copolymers:
(i) provision of from 50 to 70 parts by weight of an agglomerated graft base B which comprises from 90 to 95% by weight, based on solids contents of polybutadiene and from 5 to 10% by weight, based on solids content, of styrene monomers;
(ii) addition of a total of from 30 to 50 parts by weight of styrene A1 and acrylonitrile A2 in a ratio by mass of A1 to A2 of from 60 to 40 to 90 to 10 to the graft base B over a defined monomer feed time;
(iii) simultaneous graft copolymerization of the added styrene A1 and acrylonitrile A2 onto the agglomerated graft base B; and
(iv) then addition of vinyl cyanide monomers A2 and graft copolymerization of these onto the graft base B, where no styrene monomers A1 are added,
where, in step (ii), the decrease over the ratio by mass of styrene A1 to acrylonitrile A2 in the monomer feed is substantially continuously linear over the monomer feed time, where the ratio by mass in the final tenth of the monomer feed time is lower by at least 10% than the ratio by mass in the monomer feed integrated over the entire monomer feed time.

The styrene graft copolymers obtained from the process described above of the invention are preferably produced by emulsion polymerization and then precipitated by contact with salt solution. There is very little resultant reduction in the content of hydrophobic, i.e. substantially insoluble, styrene monomers associated with the styrene graft copolymers. In contrast, contact with aqueous salt solution removes the more hydrophilic vinyl cyanide monomers, these being more soluble in water. However, the process of the invention can also reduce the quantity of residual styrene monomers.

In a preferred embodiment, the resultant styrene graft copolymers are brought into contact with aqueous salt solution after polymerization of the styrene monomers A1 and vinyl cyanide monomers A2.

It is preferable that the aqueous salt solution is a non-toxic and odorless aqueous salt solution, in particular an aqueous salt solution which is substantially free from toxic and odoriferous constituents. The advantage of use of a non-toxic and odor-free aqueous salt solution is inter alia that there is in particular no need for concern even when the resultant styrene graft copolymers are used in sensitive application sectors. This aqueous salt solution can be any salt solution in which the resultant styrene graft copolymers are insoluble or have low solubility.

The salt solution comprises by way of example preferably from 10 mM to 1000 mM of cations, more preferably from 20 mM to 500 mM of cations, still more preferably from 30 mM to 400 mM of cations, still more preferably from 40 mM to 300 mM of cations, still more preferably from 50 mM to 200 mM of cations, in particular from 50 mM to 100 mM of cations. It is preferable that the cations are inorganic metal cations, in particular magnesium cations ($Mg^{2+}$).

The salt solution comprises by way of example preferably from 10 mM to 1000 mM of anions, more preferably from 20 mM to 500 mM of anions, still more preferably from 30 mM to 400 mM of anions, still more preferably from 40 mM to 300 mM of anions, still more preferably from 50 mM to 200 mM of anions, in particular from 50 mM to 100 mM of anions. It is preferable that the anions are inorganic anions, in particular sulfate anions ($SO_4^{2-}$). The aqueous salt solution comprises by way of example preferably from 0.2 to 5% by weight of magnesium sulfate ($MgSO_4$), still more preferably by way of example from 0.5 to 2% by weight of magnesium sulfate, still more preferably by way of example from 0.6 to 1.5% by weight of magnesium sulfate, in particular by way of example 0.6 to 1.2% by weight of magnesium sulfate.

The styrene graft copolymers can be brought into contact with the aqueous salt solution in any desired manner. By way of example, salt (for example magnesium sulfate) can be added to the aqueous emulsion comprising the styrene graft copolymers. Alternatively, it is also possible to add a more concentrated salt solution which then, together with the aqueous emulsion, provides the desired final concentration.

In an embodiment to which still more preference is given, the styrene graft copolymers are then separated from the aqueous salt solution.

In one, non-restrictive, case this can be achieved in that the contact with the aqueous salt solution precipitates the styrene graft copolymers from the emulsion solution, and said copolymers can then be separated by means of any desired method available in the prior art. By way of example, the styrene graft copolymers can be separated by filtration and/or by centrifuging. Alternatively, cross-flow filtration systems are also suitable for the separation process.

The unpolymerized vinyl cyanide monomers A2 removed can be discarded or reused here.

In a preferred embodiment, the unpolymerized vinyl cyanide monomers A2 are then removed from the aqueous salt solution and optionally reused for addition in step (ii) or (iv).

The vinyl cyanide monomers A2 removed can optionally be purified before reuse, and this can be achieved by any desired standard methods, for example column chromatography.

The process of the invention can provide styrene graft copolymers with reduced residual monomer content.

Accordingly, another aspect of the invention provides a styrene graft copolymer obtainable (or obtained) by the process of the invention.

The monomer distribution of the polymerized monomers of the graft shell A in this type of styrene graft copolymer can optionally exhibit a gradient in such a way that at positions relatively close to the graft base B the content of vinyl cyanide monomers A2 is smaller, and the content of styrene monomers A1 is greater, than at a more external position at the surface of the styrene graft copolymer.

The extent of this type of gradient depends on the gradient profile of the decrease of the ratio by mass of A1 to A2 during polymerization of the monomers A1 and A2 onto the graft base B. Accordingly, even when the ratio is one that is routinely used, of about 80 parts by weight of styrene to 20 parts by weight of vinyl cyanide, the process of the invention can provide, at the surface of the resultant styrene graft copolymers, higher vinyl cyanide content which is significantly closer to that routinely used for a polymer matrix (a styrene acrylonitrile matrix with a ratio of from 70 to 75 parts by weight of styrene to from 25 to 30 parts by weight of acrylonitrile). This can further improve the miscibility of the styrene graft copolymers with the polymer matrix, and accordingly can provide improved molding compositions.

It is preferable that the structure of the styrene graft copolymer here is substantially spherical. The average diameter $d_{50}$ of the styrene graft copolymer is from 25 to 2500 nm, more preferably from 30 to 2000 nm, still more preferably from 40 to 1000 nm, still more preferably from 50 to 750 nm, still more preferably from 60 to 500 nm, still more preferably from 70 to 400 nm, in particular from 75 to 300 nm. The average diameter of the styrene graft copolymer can also be about 75-200 nm, 75-150 nm, or 100-130 nm.

The particle size distribution of the styrene graft copolymer can be as desired. It is preferable that the size of 90% of the particles of the styrene graft copolymer is in the range of no more than +/−75% deviation from the average diameter of the styrene graft copolymer. If therefore by way of example the average diameter of the styrene graft copolymer is 120 nm, the size of 90% of the particles of the styrene graft copolymer is in the range from 30 to 210 nm.

The size of 90% of the particles of the styrene graft copolymer is more preferably in the range of no more than +/−50% deviation from the average diameter of the styrene graft copolymer, still more preferably in the range of no more than +/−25% deviation from the average diameter of the styrene graft copolymer, in particular in the range of no more than +/−15% deviation from the average diameter of the styrene graft copolymer. As described above, it is optionally also possible to obtain bimodular, trimodular, or even multimodular styrene graft copolymers by using graft bases B with different average diameters.

Particular preference is given to styrene graft copolymers where the graft base B is a rubber-containing graft base and the graft shell A comprises at least one monomer selected from the group consisting of styrene, alpha-methylstyrene, $C_1$-$C_8$-alkyl-ring-substituted styrene, and halogen-ring-substituted styrene as component A1 and at least one acrylonitrile or methacrylonitrile as component A2.

Preference is given to styrene graft copolymers where the graft base B comprises more than 50% by weight of diene rubber and the graft shell A comprises styrene as component A1 and acrylonitrile as component A2. Preference is also given to styrene graft copolymers where the graft base B comprises more than 50% by weight, based on solids content, of polybutadiene and the graft shell A is composed of at least 50% by weight, based on solids content, of styrene and acrylonitrile (this being the entirety of components A1 and A2).

Very particular preference is given to styrene graft copolymers where the graft base B comprises from 90 to 100% by weight, based on solids content, of polybutadiene and from 0 to 10% by weight, based on solids content, of styrene, and the graft shell A is composed of at least 80% by weight, based on solids content, of styrene and acrylonitrile (this being the entirety of components A1 and A2). Very particularly preferred styrene graft copolymers are by way of example those where the graft base B is composed of from 90 to 100% by weight, based on solids content, of polybutadiene and from 0 to 10% by weight, based on solids content, of styrene, and the graft shell A comprises about 80% by weight, based on solids content of styrene and about 20% by weight, based on solids content, of acrylonitrile.

It is preferable that the residual monomer content comprised in the styrene graft copolymers (this being the content of styrene monomers A1 and acrylonitrile monomers A2 together) is as low as possible.

It is very particularly preferable that a styrene graft copolymer of the invention comprises, in each case based on solids content:
from 30 to 50% by weight of graft shell A comprising from 60 to 90% by weight of styrene and from 10 to 40% by weight of acrylonitrile; and from 50 to 70% by weight of graft base B comprising from 90 to 100% by weight of polybutadiene and from 0 to 10% by weight of styrene,
where the total content of residual monomers is below 600 ppm.

It is preferable that the styrene graft copolymer of the invention is used after mixing with one or more other thermoplastic (co)polymers (i.e. compounded to give polymer blends).

Accordingly, another aspect of the invention provides a molding composition comprising a styrene graft copolymer of the invention and also at least one other thermoplastic polymer component.

This type of molding composition also itself comprises a reduced quantity of residual monomers by virtue of the reduced content of residual monomers in the styrene graft copolymers. The molding composition therefore has less odor than comparable molding compositions comprising a corresponding styrene graft copolymer not obtained by the process of the invention (and the same applies to the molding). The molding composition moreover has improved mechanical and rheological properties because, by virtue of its increased content of vinyl cyanide monomers at the surface, the styrene graft copolymer of the invention, as described above, is mixed more effectively and more uniformly with the polymer matrix into which the styrene graft copolymers are embedded.

Production of the molded compositions of the invention made of the styrene graft copolymer of the invention and at least one other thermoplastic polymer component can be achieved by any of the known processes suitable for this purpose. However, it is preferable that the components are blended by mixing in the melt, for example by extrusion, kneading, or rolling of the components together. This can be carried out at temperatures in the range from 160 to 400° C., preferably from 180 to 280° C. In a preferred embodiment, the styrene graft copolymer is to some extent or entirely isolated in advance from the aqueous dispersion obtained during the respective production steps.

By way of example, the styrene graft copolymer can be mixed in the form of moist crumb/powder (for example with residual moisture content from 1 to 40%, in particular from 20 to 40%) with the matrix polymers, where the full drying of the graft copolymers is then achieved during the mixing process.

In a preferred embodiment, the molding composition comprises at least one styrene copolymer alongside a styrene graft copolymer of the invention.

In a more preferred embodiment, the molding composition comprises a styrene-vinyl cyanide copolymer alongside a styrene graft copolymer of the invention.

The ratio by mass of styrene to vinyl cyanide in the styrene-vinyl cyanide copolymer is preferably from 70 to 20 to 90 to 10, more preferably from 70 to 30 to 80 to 20, in particular from 74 to 26 to 78 to 22.

In an embodiment to which even more preference is given, the molding composition comprises a styrene-acrylonitrile copolymer (SAN copolymer, SAN) alongside a styrene graft copolymer of the invention.

In an embodiment to which even more preference is given, the molding composition comprises a styrene-acrylonitrile copolymer with a ratio by mass of styrene to acrylonitrile of from 70:30 to 90:10, alongside a styrene graft copolymer of the invention.

The ratio by mass of styrene to vinyl cyanide in the styrene-vinyl cyanide copolymer is particularly preferably from 70 to 30 to 80 to 20, in particular from 74 to 26 to 78 to 22, by way of example about 76 to 24. The average molecular weight (Mw) of the styrene-vinyl cyanide copolymer, in particular styrene-acrylonitrile copolymer, is from 50 to 250 kDa, more preferably from 75 to 200 kDa, still more preferably from 100 to 200 kDa. By way of example, the average molecular weight is about 120 kDa or about 150 kDa. The person skilled in the art is aware of numerous methods for determining the average molecular weight, examples being gel permeation chromatography (GPC), sedimentation analysis by means of centrifuging, and viscometry (i.e. determination of rheology in solution). The average molecular weight can preferably be determined by viscometry, where the average molecular weight corresponds to the viscosity-average molar mass.

The molding composition preferably comprises at least 50% by weight of styrene-vinyl cyanide copolymer, more preferably at least 60% by weight of styrene-vinyl cyanide-copolymer, still more preferably at least 70% by weight of styrene-vinyl cyanide-copolymer, still more preferably at least 80% by weight of styrene-vinyl cyanide-copolymer, still more preferably at least 90% by weight of styrene-vinyl cyanide-copolymer, in particular at least 95% by weight of styrene-vinyl cyanide copolymer.

It is preferable here that the styrene-vinyl cyanide copolymer is a copolymer as described above, i.e. very particularly preferably a styrene-acrylonitrile copolymer with a ratio by mass of styrene to vinyl cyanide of from 70 to 30 to 80 to 20, and with an average molecular weight (Mw) of about 100 to 200 kDa.

In another preferred embodiment, the molding composition also comprises at least one polycarbonate, at least one polyester, or at least one polyamide.

The molding composition of the invention can moreover comprise one or more other components. The molding composition can optionally by way of example comprise one or more additives. The expressions "additive", "auxiliary", "additional material" and "added material" as used herein are interchangeable. Additives in the widest sense can be any non-polymeric additions. It is preferable that an additive has a waxy or talc-type texture under standard conditions (20° C., 1013 mbar, with no admixed solvent), and/or that its molecular weight is no more than 5 kDa, preferably no more than 1 kDa.

For the purpose of the present invention, an additive can be any additive for use in thermoplastic molding compositions. The additive can by way of example be a stabilizer (e.g. a light stabilizer (e.g. a UV-light-absorbing agent, a resorcinol, salicylate, benzotriazole, or benzophenone), a processing aid, a free-radical scavenger, or a glossing agent.

It can also be an antioxidant (e.g. a hydroquinone derivative, a tocopherol derivative, an Irganox compound, a phenolic antioxidant, or a sulfur-containing compound), a metal chelator, an antistatic agent (N,N-bis(hydroxyalkyl)alkylamine or -alkyleneamine, polyethylene glycol esters, copolymers of ethylene oxide glycol and propylene oxide glycol (in particular two-block or three-block copolymers made of ethylene oxide blocks and of propylene oxide blocks), and glycerol mono- and distearates, and also mixtures of these), a flow aid, a release agent, a metal ion, a fatty acid, a dye/pigment (e.g. industrial carbon black, titanium dioxide, phtalocyanides, ultramarine blue, iron oxide, zinc oxide, or any other inorganic or organic dye), a reinforcing agent, a thickener, a thinner, a compounding aid, a filler (e.g. kaolin, chalk, talc, calcium carbonate, magnesium carbonate, glass beads, silicate, quartz, mica, bentonite, feldspar, calcium silicates, or graphite).

The additive can also be an antidripping agent (e.g. polytetrafluoroethylene or high-molecular-weight polystyrene (Mw>2000 kDa)), fibers (e.g. glass fibers, carbon nanotubes), aluminum oxide, a lubricant and mold release agent (e.g. stearyl acids, stearyl alcohol, stearic esters, amide waxes (bisstearylamide), polyolefin waxes, or in general terms higher fatty acids, derivatives of these, and corresponding fatty acid mixtures having from 12 to 30 carbon atoms, ethylenebisstearamide (e.g. Irgawax, BASF, Ludwigshafen, Germany), and/or a flame retardant (e.g. a halogen- and/or phosphorus-containing flame retardant, magnesium hydroxide).

Standard processes for the processing of thermoplastics can be used to produce moldings from the molding compositions of the invention, for example by extrusion, injection molding, blow molding, compression molding, pressure sintering or other sintering, thermoforming, or calendering. The molding can alternatively also be produced by 3D printing.

Accordingly, another aspect of the invention provides a molding obtained from a molding composition of the invention.

A molding of this type can by way of example be a substantially non-resilient plastics molding or a resilient plastics molding. The moldings can by way of example be semifinished products, films, fibers, foams, or sheets. The molding can optionally comprise fibers alongside the molding composition of the invention, i.e. can have fiber-reinforcement.

A molding of this type itself also comprises lower residual monomer content by virtue of the lower residual monomer content in the molding composition on which the molding is based.

The molding therefore has less odor than comparable moldings produced from a corresponding molding composition not obtained by the process of the invention. The molding moreover has improved mechanical properties because, by virtue of its increased content of vinyl cyanide monomers at the surface, in the molding composition on which the molding is based the styrene graft copolymer of the invention, as described above, is mixed more effectively and more uniformly with the polymer matrix into which the styrene graft copolymers are embedded.

The molding can optionally also be part of a composite material, i.e. by way of example can have been bonded to at least one metal layer, to at least one metal-layer particle, to at least one wood layer, to at least one wood particle, to at least one plastics layer, and/or to at least one plastics particle. A sandwich structure can optionally also be achieved by this means.

Composite materials of this type can be obtained in that either the molding of the invention is first produced and is then bonded to another constituent or a plurality of other constituents or in that production takes place directly during production of the composite material, rather than earlier.

Accordingly, another aspect of the invention provides a composite material which comprises a molding of the invention.

A molding of the invention or a composite material of the invention can itself be a product or part of a product.

Accordingly, another aspect of the invention provides a product which comprises a molding of the invention and/or which comprises a composite material of the invention.

The experimental examples set out below, and the claims, provide further explanation of the invention.

EXAMPLES

1. Test Methods that can be Used

The test methods that can be used to characterize the polymers will first be briefly summarized:

a) Charpy Notched Impact Resistance [kJ/m$^2$]:

Notched impact resistance can be determined on test samples (80×10×4 mm, produced by injection molding at melt temperature 240° C. and mold temperature 70° C.) at 23° C. in accordance with ISO 179-1A (in the version current in 2014).

b) Flowability (MVR [ml/10 min]):

Flowability can be determined on a polymer melt at 220° C. with 10 kg load in accordance with ISO 1133 (in the version current in 2014).

c) Particle Size [nm]:

The weight-average particle size $d_w$ of the rubber dispersions of the graft base B and of the agglomerated graft base B can be measured by using a DC 24000 disk centrifuge from CPS Instruments Inc.

Stable flotation behavior of the particles can be achieved by determining the value in 17.1 ml of an aqueous sugar solution with sucrose density gradient from 8 to 20% by weight. A polybutadiene latex with narrow distribution and average particle size 405 nm can be used for calibration. The measurements can be made with a disk rotation rate of 24 000 rpm by injecting 0.1 ml of a dilute rubber dispersion (aqueous 24% by weight sucrose solution comprising about 0.2-2% by weight of rubber particles) into the disk centrifuge comprising the aqueous sugar solution with sucrose density gradient from 8 to 20% by weight. The weight-average particle size $d_w$ of the agglomerating copolymer can be measured with the DC 24000 disk centrifuge from CPS Instruments Inc. by using 17.1 ml of an aqueous sugar solution with sucrose density gradient from 3.5 to 15.5% by weight, in order to achieve stable sedimentation behavior of the particles. A polyurethane latex (particle density 1.098 g/ml) with narrow distribution and average particle size 155 nm can be used for calibration.

The measurements can be made with a disk rotation rate of 24 000 rpm by injecting 0.1 ml of a dilute dispersion of the copolymer (produced by dilution with water as far as 1-2% by weight content) into the disk centrifuge comprising the aqueous sugar solution with sucrose density gradient from 3.5 to 15.5% by weight. The following formula is used to calculate the weight-average particle size $d_w$ and weight-average particle diameter $d_{50}$, and also $d_{10}$ and $d_{90}$:

$$d_w = \mathrm{sum}(ni*di^4)/\mathrm{sum}(ni*di^3),$$

where ni is the number of particles with diameter di.

Solids contents can be measured after drying of the samples at 180° C. for 25 min in a drying cabinet.

d) Gloss:

Gloss can be determined by using an injection-molded machine at melt temperature 240° C. and mold temperature 70° C. to produce rectangular plaques with dimensions 60 mm×40 mm×2 mm from the polymer melt. Surface gloss can be measured by reflection measurement in accordance with DIN 67530 (in the version current in 2014) at an angle of 20°.

e) Yellowness Index YI:

The YI value can be determined on plaques with dimensions 60×40×2 mm produced by injecting molding at melt temperature 240° C. and mold temperature at 70° C. in accordance with ASTM method E313-96 (illuminant/observer combination C/2°).

f) Swelling Index QI and Gel Content [%]:

The gel content values can be determined by the wire cage method in toluene (see Houben-Weyl, Methoden der Organischen Chemie, Makromolekulare Stoffe, [Methods of Organic Chemistry, Macromolecular substances] part 1, p. 307 (1961), Thieme Verlag Stuttgart). A film can be produced from the aqueous dispersion of the graft base by evaporating the water. 50 g of toluene can then be admixed with 0.2 g of this film. After 24 hours, the toluene can be removed from the swollen sample, and the sample can be weighed. After drying of the sample in vacuo at 110° C. for 16 hours, weighing can then be repeated. The swelling index is determined as follows:

swelling index SI=[swollen gel with toluene before drying]/[gel after drying]

Gel content is determined as follows:

gel content=[mass of sample dried in vacuo]/[starting weight of sample before swelling]×100

2. Production of Components and Molding Compositions

Production and agglomeration of graft base B

The graft base B is produced by emulsion polymerization by the feed process. 7% by weight of styrene is used as comonomer.

The emulsion polymerization is carried out at a temperature of 67° C. in a 150 L reactor. 43 120 g of the monomer mixture (butadiene and styrene) are polymerized at 67° C. in the presence of 431.2 g of tert-dodecyl mercaptan (TDM), 311 g of potassium stearate, 82 g of potassium persulfate, 147 g of sodium hydrogencarbonate, and 58 400 g of demineralized water, giving a latex of the graft base with 41.5% by weight solids content. The sequence in which the monomers are charged to the reactor is as follows:

a quantity of 7% by weight of styrene, based on the total quantity of monomer, is first added within 20 minutes. Styrene addition is followed by addition of a first portion of the butadiene, the quantity being 7% by weight, based on the total quantity of monomer, within 25 minutes. The remaining portion of the butadiene, corresponding to 86% by weight, based on the total quantity of monomer, is then added within 8.5 hours. TDM is added all at once at the start of the reaction. Conversion is 95%.

The resultant graft base B has 7% by weight styrene content, based on solids content, 76.6% by weight gel content, swelling index 22, $d_{10}$ 71 nm, $d_{50}$ 84 nm, and $d_{90}$ 100 nm.

For agglomeration, 4792.39 g of aqueous dispersion of the graft base B (graft base content: 43.18%) and 347.61 g of demineralized water were charged to a 10 liter four-necked flask with metal stirrer. This mixture was heated in a waterbath equipped with a cooling coil and with an immersion heater to 68° C. and was stirred at 180 revolutions per minute (rpm). 110.49 g of Agglonal 574 in 323.75 g of demineralized water were added to said dispersion over a period of 25 min. 17.94 g of potassium stearate in a further 1311.10 g of demineralized water were added to said dispersion. Stirring at 180 rpm was then continued for 5 min. Production and use of Agglonal is described by way of example in WO 2014/170406, WO 2014/170407, and PCT/EP2014/057826.

A corresponding graft base B can also be purchased from a commercial source.

Styrene Graft Copolymer

For direct comparison of conventional styrene graft copolymers with styrene graft copolymers of the invention, styrene graft copolymers produced by a comparable method and differing only in the monomer feed program were produced:

a) by means of a conventional production process, with no change of the ratio by mass of styrene monomers A1 to vinyl cyanide monomers A2 in the monomer feed (comparative experiment);

b) by means of a production process where the ratio by mass of styrene monomers A1 to vinyl cyanide monomers A2 is reduced toward the end of the monomer feed time; and c) by means of a production process where the ratio by mass of styrene monomers A1 to vinyl cyanide monomers A2 is reduced toward the end of the monomer feed time, and vinyl cyanide monomers A2 are then added.

a) No change of the ratio by mass of styrene monomers A1 to vinyl cyanide monomers A2 in the monomer feed (comparative experiment, conventional production)

2.36 of potassium peroxodisulfate in 100.00 g of demineralized water were added to the agglomerated graft base B in order to initiate the graft polymerization. The mixture here was stirred at 220 rpm. Styrene monomers A1 and acrylonitrile monomers A2 were then added in accordance with the following program described in table 1:

TABLE 1

Addition of styrene monomers A1 and acrylonitrile monomers A2 with no change of ratio by mass

| Feed | Feed time [min] | Mass of styrene added [g] | Mass of acrylonitrile added [g] | Styrene:acrylonitrile ratio by mass |
|---|---|---|---|---|
| A | 34 | 262.40 | 65.60 | 80:20 |
| B | 120 | 787.20 | 196.80 | 80:20 |

Feed A here was carried out at a temperature of 68° C. with stirring at 220 rpm. After feed A, polymerization was continued for 10 min at a temperature of 68° C., with stirring at 220 rpm.

Feed B here was carried out at a temperature increasing linearly from 68° C. to 80° C., with stirring at 220 rpm. The resultant ratio by mass of styrene to acrylonitrile integrated over the entire monomer feed time is 80 to 20.

The graft polymerization was concluded by adding a further 2.36 g of potassium peroxodisulfate in 100.00 g of demineralized water, with stirring, and continuing polymerization, with stirring, for 60 min at 80° C. 64.00 g of the antioxidant Wingstay L were moreover added, with stirring. Approximately 1% by weight of magnesium sulfate solution was then used in conventional manner for precipitation. The graft copolymer was filtered, and then the precipitate was washed twice with demineralized water, and further processed by means of a dewatering extruder as in WO 2004/028781 or WO 2009/103714.

b) Reduction of the ratio by mass of styrene monomers A1 to vinyl cyanide monomers A2 in the monomer feed The process corresponded to the process described above in a), except that styrene monomers A1 and acrylonitrile monomer A2 were added in accordance with the following program described in table 2:

TABLE 2

Addition of styrene monomers A1 and acrylonitrile monomer A2 with gradient in ratio by mass

| Feed | Feed time [min] | Mass of styrene added [g] | Mass of acrylonitrile added [g] | Styrene:acrylonitrile ratio by mass |
|---|---|---|---|---|
| A | 34 | 282.34 | 45.92 | 86:14 |
| b1 | 40 | 268.70 | 59.04 | 82:18 |
| b2 | 40 | 256.10 | 72.16 | 78:22 |
| b3 | 40 | 242.46 | 85.28 | 74:26 |

Feed A here was carried out at a temperature of 68° C. with stirring at 220 rpm. After feed A, polymerization was continued for 10 min at a temperature of 68° C., with stirring at 220 rpm.

Feeds b1-3 here were carried out at a temperature increasing linearly from 68° C. to 80° C. over the entirety of these feed times, with stirring at 220 rpm.

The resultant ratio by mass of styrene to acrylonitrile integrated over the entire monomer feed time is 80 to 20.

c) Reduction of the ratio by mass of styrene monomers A1 to vinyl cyanide monomers A2 in the monomer feed, and then addition of vinyl cyanide monomers A2

The process corresponded to the processes described above in a) and b), except that styrene monomers A1 and acrylonitrile monomers A2 were added in accordance with the following program described in table 3:

TABLE 3

Addition of styrene monomers A1 and acrylonitrile monomers A2 with gradient in ratio by mass followed by acrylonitrile monomer feed over 10 min

| Feed | Styrene feed time [min] | Mass of styrene added [g] | Acrylonitrile feed time [min] | Mass of acrylonitrile added [g] | Styrene:acrylonitrile ratio by mass |
|---|---|---|---|---|---|
| A | 34 | 282.34 | 34 | 45.92 | 86:14 |
| b1 | 40 | 268.70 | 40 | 59.04 | 82:18 |
| b2 | 40 | 256.10 | 40 | 72.16 | 78:22 |
| b3 | 30 | 242.46 | 40 | 85.28 | 74:26 |

Feed A here was carried out at a temperature of 68° C. with stirring at 220 rpm. After feed A, polymerization was continued for 10 min at a temperature of 68° C., with stirring at 220 rpm.

Feeds b1-3 here were carried out at a temperature increasing linearly from 68° C. to 80° C. over the entirety of these feed times, with stirring at 220 rpm.

In the final 10 min of the feed time, as can be seen from table 3, only acrylonitrile monomers A2 were added, and no further styrene monomers A1. The resultant ratio by mass of styrene to acrylonitrile integrated over the entire monomer feed time is 80 to 20.

Corresponding procedures were used to produce mixtures where only acrylonitrile monomers A2, and no further styrene monomers A1, were added in the final 10 min, 20 min, or 30 min of the feed time.

Thermoplastic Copolymer

Random copolymer of styrene and acrylonitrile (SAN copolymer) with styrene to acrylonitrile ratio of 76:24, with viscosity number 64 ml/g (concentration 5 g/l in dimethylformamide at 20° C.) and melt flow rate MVR at 64 [ml/10 min] measured at 220° C. with 10 kg loading in accordance with ISO 1133 (in the version current in 2014), produced by free-radical solution polymerization.

Additives

Polydimethylsiloxane silicone oil with kinematic viscosity 30 000 mm$^2$/s

Thermoplastic molding compositions made of SAN polymer and styrene graft copolymer The SAN polymer and an abovementioned styrene graft copolymer were mixed in a twin-screw extruder with screw diameter 25 mm. The temperature in the extrusion zone was set to from 200 to 250° C., and processing in the twin-screw extruder took place at 700 rpm.

The batch size for all examples was 4 kg. The resultant ABS molding compositions were tested to determine flowability (MVR), Charpy notched impact resistance, Yellowness Index (YI), and surface gloss. The test methods listed above were used here.

3. Test Results

The following results were achieved for the molding compositions in two independent series of experiments:

TABLE 4

Experimental series 1. This used 33% by weight of graft rubber, 66% by weight of SAN, and 1% by weight of stabilizer masterbatch.

| | Production process for styrene graft copolymer | | | | |
|---|---|---|---|---|---|
| Property | Constant A1:A2 ratio by mass (comparison) | Gradient of A1:A2 ratio by mass | Gradient of A1:A2 ratio by mass, addition of A2 in final 10 min | Gradient of A1:A2 ratio by mass, addition of only A2 in final 20 min | Gradient of A1:A2 ratio by mass, addition of only A2 in final 30 min |
| Charpy notched impact resistance, RT [kJ/m$^2$] | 28.3 | 28.3 | 30.4 | 30.6 | 35.1 |
| Charpy notched impact resistance, −20° C. [kJ/m$^2$] | 8.56 | 8.97 | 10.9 | 9.45 | 8.95 |
| Flowability (MVR) [ml/10 min] | 10.32 | 10.45 | 10.72 | 10.77 | 10.43 |
| Yellowness Index (YI) | 20.5 | 19.2 | 20.2 | 21.2 | 23.3 |

TABLE 4-continued

Experimental series 1. This used 33% by weight of graft rubber, 66% by weight of SAN, and 1% by weight of stabilizer masterbatch.

| | Production process for styrene graft copolymer | | | | |
|---|---|---|---|---|---|
| Property | Constant A1:A2 ratio by mass (comparison) | Gradient of A1:A2 ratio by mass | Gradient of A1:A2 ratio by mass, addition of A2 in final 10 min | Gradient of A1:A2 ratio by mass, addition of only A2 in final 20 min | Gradient of A1:A2 ratio by mass, addition of only A2 in final 30 min |
| Surface gloss, 20° | 81.8 | 82.1 | 80.9 | 81.3 | 79.4 |
| Residual styrene monomers [ppm] | 600 | 470 | 440 | 440 | 430 |
| Residual acrylonitrile monomers [ppm] | 3 | 3 | 3 | 3 | 4 |
| Rubber content [% by wt.] | 34.5 | 34.7 | 34.9 | 35.0 | 34.7 |

TABLE 5

Experimental series 2. This used 35% by weight of graft rubber, 64% by weight of SAN, and 1% by weight of stabilizer masterbatch.

| | Production process for styrene graft copolymer | | | | |
|---|---|---|---|---|---|
| Property | Constant A1:A2 ratio by mass (comparison) | Gradient of A1:A2 ratio by mass | Gradient of A1:A2 ratio by mass, addition of only A2 in final 10 min | Gradient of A1:A2 ratio by mass, addition of only A2 in final 20 min | Gradient of A1:A2 ratio by mass, addition of only A2 in final 30 min |
| Charpy notched impact resistance, RT [kJ/m$^2$] | 30.3 | 30.1 | 33.4 | 33.1 | 36.9 |
| Charpy notched impact resistance, −20° C. [kJ/m$^2$] | 11.0 | 10.8 | 11.4 | 11.3 | 11.4 |
| Flowability (MVR) [ml/10 min] | 9.09 | 9.70 | 9.18 | 9.51 | 9.33 |
| Yellowness Index (YI) | 19.8 | 18.5 | 19.9 | 19.6 | 22.4 |
| Surface gloss, 20° | 84.7 | 83.2 | 82.8 | 82.5 | 80.8 |
| Residual styrene monomers [ppm] | 630 | 490 | 460 | 430 | 450 |
| Residual acrylonitrile monomers [ppm] | 3 | 3 | 3 | 3 | 4 |
| Rubber content [% by wt.] | 36.9 | 36.3 | 37.4 | 37.1 | 36.4 |

From the experimental data revealed above (see tables 4 and 5) it can be seen that the molding compositions produced by a comparable method and differing only in the monomer feed program (constant with no change or gradient, with or without addition of only acrylonitrile at the end of feed time) have comparable physical and chemical properties such as notched impact resistance at room temperature (RT) and −20° C., flowability, Yellowness Index, surface gloss, and rubber content.

In contrast to this, the content of residual styrene monomers in the molding composition has been reduced significantly by the feed gradient from 600 to 470 ppm and, respectively, from 630 to 490 ppm, therefore being lower by about 22% than in the molding composition comprising styrene graft copolymers produced by means of a conventional production process with no change of A1:A2 ratio by mass. Indeed, addition of acrylonitrile without further addition of styrene in the final 10 min of the feed time reduces the content of residual styrene monomers by about 27% in comparison with the molding composition comprising styrene graft copolymers produced by means of a conventional production process without change of A1:A2 ratio by mass. A further improvement by about 5% therefore occurs here.

Since the content of residual acrylonitrile monomers remains approximately the same, there is an equally large reduction in the total content of residual monomers (i.e. residual styrene monomers and residual acrylonitrile monomers).

The reduction of residual monomer content also reduces the quantity of volatile residual monomers liberated, thus reducing the liberated quantity of residual monomers detectable by odor. The molding compositions of the invention therefore have less odor than comparable molding compositions produced by means of a conventional production process with constant addition of styrene and acrylonitrile.

It will be apparent that the changes described in residual monomer content derive only from the changes in residual monomer content in the styrene graft copolymers, while also being the changes in residual monomer content in the entire molding composition. Changes in the actual styrene graft copolymers used are therefore even more significant.

Surprisingly, it has also been shown that the reduced content of residual monomers has not been achieved merely by virtue of the greater ease of removal of the vinyl cyanide monomers A2 from the styrene graft copolymers. The content of residual monomers was already significantly reduced in the pre-work-up dispersion comprising these styrene graft copolymers by the process of the invention.

In this connection, dispersions which comprise styrene graft copolymers and were produced by means of a conventional production process with constant addition of styrene and acrylonitrile were compared with those produced by means of a process with a monomer feed gradient from 16 to 24% by weight of acrylonitrile and from 84 to 76% by weight of styrene (see table 6):

The total quantity of residual monomers in the dispersion was reduced significantly from 3840 to 3460 ppm by the feed gradient, therefore being lower by about 10% than in the dispersion comprising styrene graft copolymers produced by means of a conventional production process without change in A1:A2 ratio by mass.

Indeed, addition of acrylonitrile without further addition of styrene in the final 10 min of the feed time reduces the total content of residual monomers by about 24% in comparison with the dispersion comprising styrene graft copolymers produced by means of a conventional production process without change of A1:A2 ratio by mass. A further improvement by about 14% therefore occurs here.

The dispersions of the invention therefore have reduced odor when compared with comparable dispersions produced by means of a conventional production process with constant addition of styrene and acrylonitrile.

The same applies to the moldings produced from the molding compositions of the invention.

What is claimed is:
1. A process for the production of styrene graft copolymers comprising the following steps:
   (i) provision and agglomeration of the graft base B present in an emulsion;
   (ii) addition of styrene monomers A1 and vinyl cyanide monomers A2 to the graft base B over a defined monomer feed time; and
   (iii) simultaneous graft copolymerization of the added styrene monomers A1 and of the vinyl cyanide monomers A2 onto the agglomerated graft base B,
   where, in step (ii), the ratio by mass of styrene monomers A1 to vinyl cyanide monomers A2 in the monomer feed at the end of the monomer feed time is lower than the ratio by mass of the components of the monomer feed integrated over the entire monomer feed time,
   where step (iii) is followed by the following step (iv), which comprises:

TABLE 6

Experimental series 3

Production process for styrene graft copolymer

| Property | Constant A1:A2 ratio by mass (comparison) | Gradient of A1:A2 ratio by mass | Gradient of A1:A2 ratio by mass, addition of only A2 in final 10 min | Gradient of A1:A2 ratio by mass, addition of only A2 in final 20 min | Gradient of A1:A2 ratio by mass, addition of only A2 in final 30 min |
|---|---|---|---|---|---|
| Residual styrene monomers [ppm] | 3700 | 3200 | 2700 | 2300 | 1500 |
| Residual acrylonitrile monomers [ppm] | 130 | 250 | 180 | 570 | 400 |
| Residual butadiene monomers [ppm] | <10 | <10 | <10 | <10 | <10 |
| Residual ethylbenzene monomers [ppm] | 10 | 10 | 10 | 10 | 10 |
| Entirety of residual monomers [ppm] | 3840 | 3460 | 2890 | 2880 | 1910 |

(iv) addition of vinyl cyanide monomers A2 and graft copolymerization of these onto the agglomerated graft base B, where no styrene monomers A1 are added.

2. The process as claimed in claim 1, where the graft base B is a rubber-containing graft base.

3. The process as claimed in claim 1, where the styrene monomers A1 are selected from the group consisting of styrene, α-methylstyrene, $C_1$-$C_8$-alkyl-ring-sybstituted styrene, and mixtures of two or more thereof.

4. The process as claimed in claim 1, where the vinyl cyanide monomers A2 are acrylonitrile, methacrylonitrile, or mixtures thereof.

5. The process as claimed in claim 1, where the ratio by mass of styrene monomers A1 to vinyl cyanide monomers A2 integrated over the entire monomer feed time is from 50:50 to 95:5.

6. The process as claimed in claim 1, where, in step (ii), the ratio by mass of styrene monomers A1 to vinyl cyanide monomers A2 in the monomer feed in the final fifth of the monomer feed time is lower by at least 10% than the ratio by mass integrated over the entire monomer feed time.

7. The process as claimed in claim 1, where in step (ii), the ratio by mass of styrene monomers A1 to vinyl cyanide monomers A2 decreases progressively over the monomer feed time.

8. The process as claimed in claim 1, where the ratio by mass of graft base B to graft shell made of styrene monomers A1 and of vinyl cyanide monomers A2 is from 80:20 to 20:80.

9. The process as claimed in claim 1, where, after polymerization of the styrene monomers A1 and vinyl cyanide monomers A2, the resultant styrene graft copolymers are brought into contact with aqueous salt solution.

10. The process as claimed in claim 9, where the unpolymerized vinyl cyanide monomers A2 are then removed from the aqueous salt solution, and the vinyl cyanide monomers A2 removed are optionally reused for addition in step (ii) or (iv).

11. A styrene graft copolymer obtainable by a process as claimed in claim 1.

12. A molding composition comprising a styrene graft copolymer as claimed in claim 11, and also at least one other thermoplastic polymer component.

13. The molding composition as claimed in claim 12, where the molding composition also comprises at least one polycarbonate, at least one polyester, or at least one polyimide.

14. A molding obtained from a molding composition as claimed in claim 12.

15. The process as claimed in claim 2, where the graft base B comprises more than 50% by weight, based on solids content, of polybutadiene.

16. The process as claimed in claim 3, where the styrene monomers A1 are styrene.

17. The process as claimed in claim 4, where the vinyl cyanide monomers A2 are acrylonitrile.

18. The process as claimed in claim 5, where the ratio by mass of styrene monomers A1 to vinyl cyanide monomers A2 integrated over the entire monomer feed time is from 70:30 to 85:15.

19. The process as claimed in claim 6, where, in step (ii), the ratio by mass of styrene monomers A1 to vinyl cyanide monomers A2 in the monomer feed in the final fifth of the monomer feed time lower by at least 25% than the ratio by mass integrated over the entire monomer feed time.

20. The process as claimed in claim 8, where the ratio by mass of graft base B to graft shell made of styrene monomers A1 and of vinyl cyanide monomers A2 is from 58:42 to 62:38.

* * * * *